(12) United States Patent
Rowley

(10) Patent No.: US 8,775,489 B2
(45) Date of Patent: Jul. 8, 2014

(54) DATABASE-BASED LOGS EXPOSED VIA LDAP

(75) Inventor: Peter Rowley, Ben Lomond, CA (US)

(73) Assignee: Red Hat, Inc., Raleigh, NC (US)

( * ) Notice: Subject to any disclaimer, the term of this patent is extended or adjusted under 35 U.S.C. 154(b) by 705 days.

(21) Appl. No.: 11/713,905

(22) Filed: Feb. 28, 2007

(65) Prior Publication Data

US 2008/0208909 A1    Aug. 28, 2008

(51) Int. Cl.
 *G06F 17/30*    (2006.01)

(52) U.S. Cl.
 USPC ......................................................... 707/828

(58) Field of Classification Search
 USPC ............ 707/1, 10, 100–104.1, 200, 204, 672, 707/828
 See application file for complete search history.

(56) References Cited

U.S. PATENT DOCUMENTS

| | | | |
|---|---|---|---|
| 6,615,223 B1* | 9/2003 | Shih et al. | 707/201 |
| 6,883,036 B1* | 4/2005 | Barrett | 709/248 |
| 7,184,995 B2* | 2/2007 | Kaw et al. | 707/1 |
| 7,571,180 B2* | 8/2009 | Minyailov | 707/102 |
| 2008/0133617 A1* | 6/2008 | Bali et al. | 707/202 |

\* cited by examiner

*Primary Examiner* — Cam-Linh Nguyen
(74) *Attorney, Agent, or Firm* — Lowenstein Sandler LLP

(57) ABSTRACT

A method and apparatus for maintaining logs for a Lightweight Directory Access Protocol (LDAP) directory server. The method includes receiving or detecting events or activities in the system to be logged. The events are transformed into LDAP entries and stored in an LDAP repository. The LDAP entries may then be searched and operated on using LDAP operations, thereby providing enhanced utility and functionality for log data using LDAP operations and an LDAP repository.

24 Claims, 6 Drawing Sheets

DATABASE-BASED LOGS EXPOSED VIA LDAP

TECHNICAL FIELD

Embodiments of the present invention relate to maintaining logs in a Lightweight Directory Access Protocol (LDAP) system, and more specifically to maintaining logs of events in the LDAP system in the form of LDAP entries in an LDAP repository.

BACKGROUND

Light Weight Directory Access Protocol (LDAP) has become very popular due to its efficient and fast data access. A large number of applications/services are currently in use and being developed which use an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes and each entry has an objectClass attribute containing named classes defined in the schema. The objectClass attribute may be multivalued and contain the class "top" as well as some number of other classes. The schema definition for each class an entry belongs to defines what kind of object the entry may represent (e.g., a person, organization or domain). Membership in a particular class gives the entry the option of containing one set of attributes (optional attributes), and the obligation of containing another set of attributes (mandatory or required attributes). For example, an entry representing a person might belong to the class "person." Membership in the "person" class would require the entry to contain the "sn" and "cn" attributes and allow the entry also to contain "userPassword," "telephoneNumber" and other attributes.

Logs of LDAP servers are stored as flat files. A flat file is a file that is a simple data structure where data is stored as entries in continues memory space without any hierarchical organization. Entries are stored one after the other in chronological order with a specified order of parameters in each entry. Entries in the log typically include parameters indicating the type of entry, a timestamp and some parameter values associated with the type of entry.

Various components of an LDAP server may each maintain separate logs. Each flat log file is stored in a file directory accessible to the LDAP server and its components. Typical log files that are maintained include an audit log, error log, or access log. These logs cannot be easily searched or navigated due to their organization. Specialized programs must be used to access and manipulate the data from these flat log files. The flat log files are also slow for the system to write to and read from as the file system is slow and the organization of the file offers no assistance in finding or retrieving entries or parameters.

BRIEF DESCRIPTION OF THE DRAWINGS

The present invention is illustrated by way of example, and not by way of limitation, in the figures of the accompanying drawings and in which.

DETAILED DESCRIPTION

Figure 1:
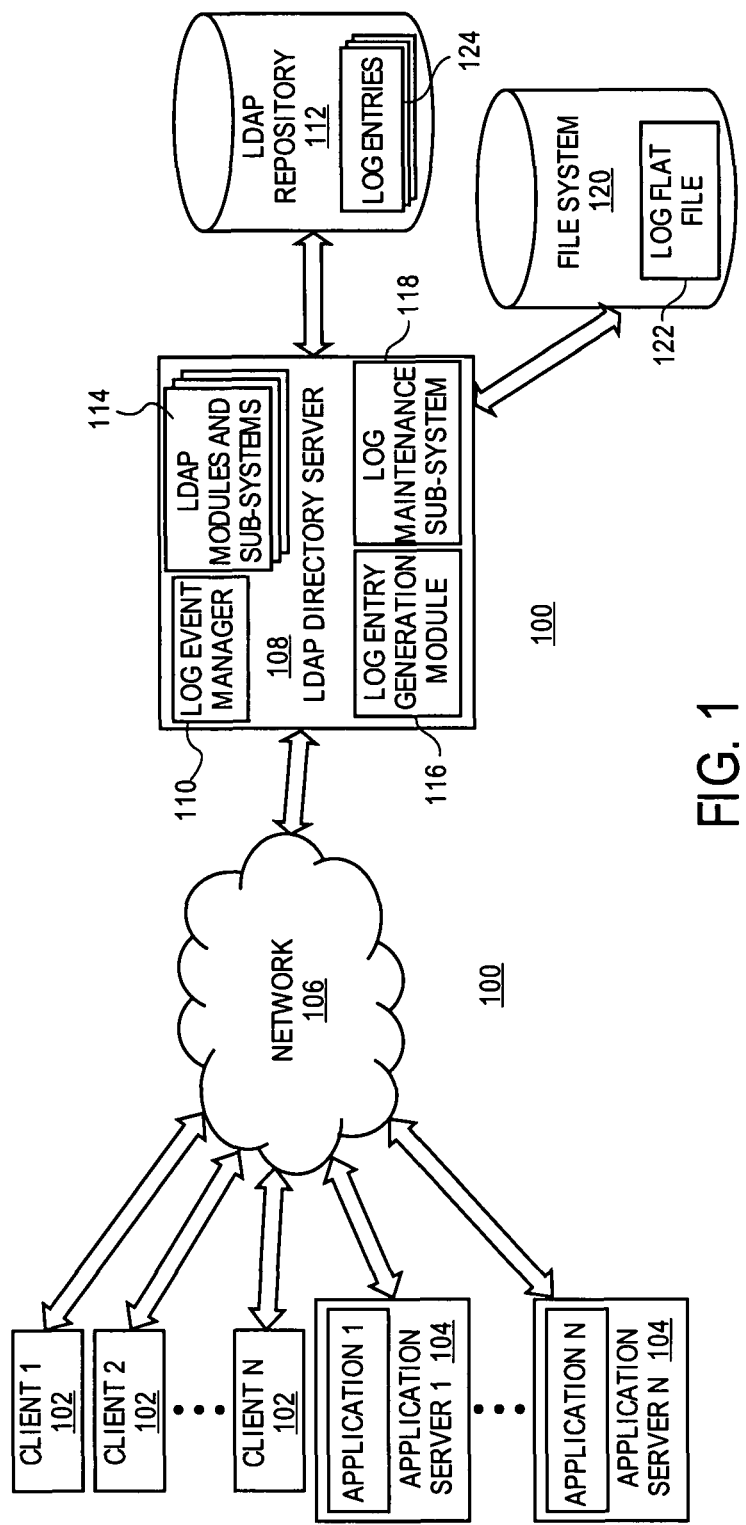
FIG. 1 is a diagram of one embodiment of a network and system including a lightweight directory access protocol (LDAP) server.

Described herein is a method and apparatus for maintaining logs for a Lightweight Directory Access Protocol (LDAP) directory server system. In one embodiment, the method includes receiving or detecting events or activities in the system to be logged. The events and activities are transformed into LDAP entries and stored in an LDAP repository. The LDAP entries may then be searched and operated on using LDAP operations, thereby providing enhanced utility and functionality for log data using LDAP operations. Search and access times are improved by leveraging the organization and speed of the LDAP repository, as well as LDAP caching and indexing.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"), random access memory ("RAM"), magnetic disk storage media; optical storage media, flash memory devices or other type of machine-accessible storage media.

FIG. 1 is a diagram of one embodiment of a network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs) or similar devices capable of communicating over the network 106 and running an LDAP client.

The clients 102 are coupled to the LDAP directory server 108 via the network 106, which may be a public network (e.g., Internet) or a private network (e.g., a virtual local area network (VLAN)). The network 106 may be a wide area network (WAN), such as the Internet, a local area network (LAN) or similar type of network. The LDAP directory server 108 may contain a server front-end responsible for network communications, plug-ins or modules for server functions (such as access control and replication), a basic directory tree containing server-related data and a database, back-end plug-in responsible for managing the storage and retrieval of LDAP repository data and similar components.

In one embodiment, the clients 102 communicate with the LDAP directory server 108 via a web server (not shown). For example, the clients 102 may execute web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that hosts various applications requesting information from the LDAP directory server 108. The application servers 104 operate as clients in communications with the LDAP directory server 108. Similar to the clients 102, the application servers 104 may communicate with the LDAP directory server 108 directly or via a web server.

The LDAP repository 112 may be part of the LDAP directory server 108 or it may reside externally (e.g., on a database server). The LDAP repository 112 may contain a tree of data entries. The structure of the entries may be specified in the definition of the LDAP repository 112. The definition of the LDAP repository 112 may be represented as a schema, a table or some other data structure and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class that an entry belongs to defines what kind of object the entry may represent (e.g., a person, organization or domain).

In one embodiment, the LDAP server 108 may include a log event manager 110, a log entry generation module 116, a log maintenance sub-system 118, and similar sub-systems and modules 114. In other embodiments, these modules may be implemented as plug-ins or similarly implemented to provide services to the LDAP server 108.

In one embodiment, the LDAP server 108 may include any number of sub-system and modules 114 that generate activities or events to be logged. Sub-systems and modules may include caching and indexing modules, LDAP operation execution modules, virtual attribute sub-systems and similar sub-systems and modules. These modules and sub-systems 114 may generate errors, system changes, create LDAP entries, access LDAP entries and other resources or similarly generate activities to be logged. Any activity in the LDAP directory server 108 may be configured by a user or system administrator to be logged. The LDAP server 108 may maintain a set of default logs such as audit, error and access logs. An administrator or other user may reconfigure, enable or disable any logs maintained by the LDAP directory server 108.

A log event manager 110 may detect or receive notification of events from the various sub-systems and modules 114. As used herein, an event may refer to any activity or action that takes place in software or hardware within the LDAP directory server or systems in communication with the LDAP directory server. The log event manager 110 may monitor the events of other modules and sub-systems to detect events defined by a user or administrator or to detect events that have been designated as default events by programmers of the system The log event manager 110 may also receive notifications such as messages or signals from the sub-systems and modules of the LDAP directory server 108. The message are directed to the log event manager 110 by each module and sub-system and inform the log event manager 110 that an event has occurred and is to be logged. As used herein, a message may refer to any type of communication of data. The log event manager 110 may then determine, which logging system is available and is to be used to record the detected or received events.

In one embodiment, a log entry generation module 116 receives events from the log event manager to be recorded in the appropriate log. The log event manager 110 may determine the appropriate log within an LDAP repository 112 or the log entry generation module 116 may make this determination. The log entry generation module 116 identifies the appropriate log in which to record an event, then generates and stores the entry for the event. The entry is in the form of an LDAP entry 124 and stored in the LDAP repository 112 (e.g., in a relevant LDAP repository sub-tree). The attributes and values stored in the entry may be defined in a configuration entry or schema that specifies the format for each log in the LDAP server directory 108 that is maintained as an LDAP log. The LDAP log organization may be specified by an administrator or user or may have default settings.

Storing logs as an LDAP sub-tree and log entries in the format of an LDAP entry allows the tools and operations of the LDAP directory server 108 to be applied to the LDAP logs. Complex searches can be defined and carried out on the LDAP entries improving the usability of the logs. The logs may be indexed and cached improving the access time to the data in the LDAP logs. All the advantages of the functionality of the LDAP server can be leveraged on logs maintained as LDAP entries in an LDAP repository. System administrators have a great deal of flexibility in being able to define the parameters of log entries and the readability and utility of the logs of the LDAP directory server 108 is increased.

In one embodiment, a log maintenance sub-system 118 may provide an alternate method for recording entries for events received from the log event manager 110 in a flat log file 122 that is stored in a file system 120. The log event manager 110 may send events to the log maintenance sub-system 118 when an LDAP log is not supported for a given event. In another embodiment, the flat log files 122 may be redundant to the LDAP log entries 124. The redundant flat log files 122 may be used as a backup system or may be used by specific LDAP directory server components, sub-systems or plug-ins that do not support the LDAP log system.

Figure 2:
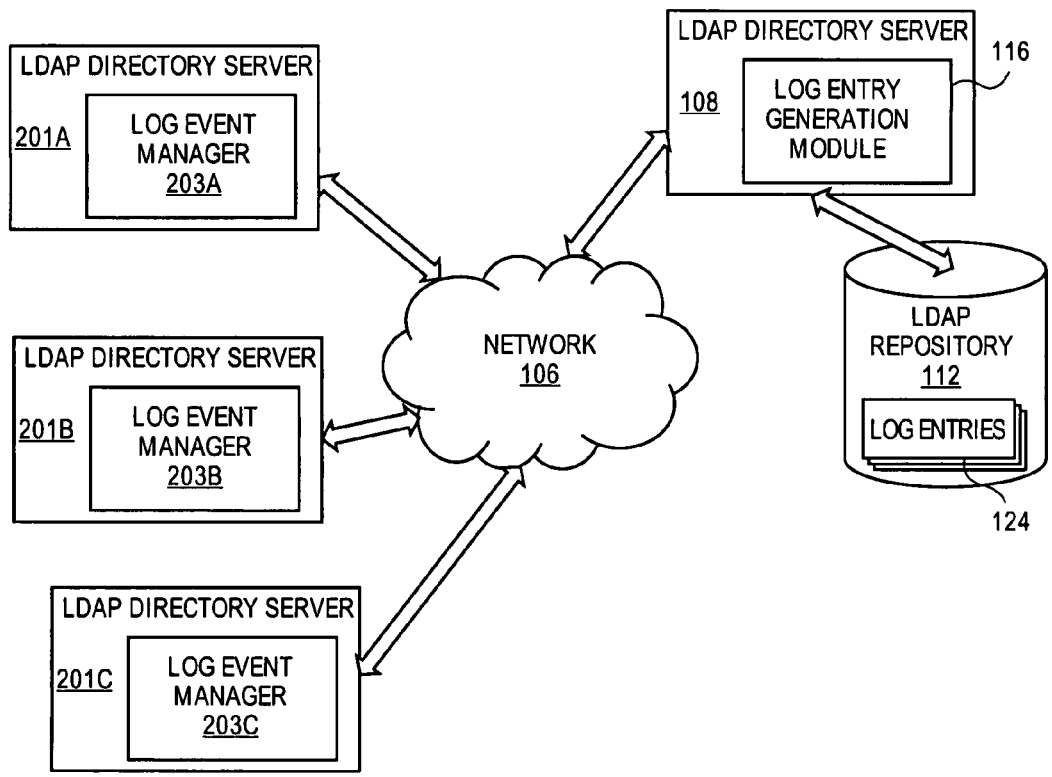
FIG. 2 is a diagram of one embodiment of a distributed log management system.

FIG. 2 is a diagram of one embodiment of a distributed log management system. In one embodiment, multiple LDAP directory servers 108, 201A-201C may utilize a single log entry generation module 116 or a set of log entry generation modules that are remote from at least a subset of the LDAP servers originating events to be logged. The set of log entry generation modules 116 may service any number of LDAP directory servers 108, 201A-201C and may manage any number of LDAP logs. In one embodiment, some log entry generation modules may be dedicated to service a particularly high volume log or similar configurations may be made to balance load across the set of log entry generation modules 116.

A single LDAP repository 112 or set of LDAP repositories may also be used in any combination with the set of log entry generation modules for storing the logs. The LDAP repository 112 for storing the LDAP logs may be a dedicated or network addressable resource or may be administered by a specific LDAP directory server 108. In one embodiment, each of the servers may have a separate set of LDAP repositories (not shown) that may be used for storing other directory information. In another embodiment, a shared set of LDAP repositories 112 may be used by all LDAP directory servers 108, 201A-201C.

In one example embodiment, a set of the LDAP directory servers 201A-201C may be remote from the set of log entry generation modules 116 that are supported by a local LDAP directory server 108. In this example, 'remote' and 'local' are in relation to the log entry generation modules 116. For example, remote LDAP directory servers 201A-201C may be in communication with the local LDAP directory server 108 that is hosting the log entry generation module 116 over a network 106. The network 106 may be any type of network including a local area network, wide area network, such as the Internet or similar network. Each remote LDAP directory server 201A-201C may include a log event manager 203A-203C or similar module that communicates with the log entry generation module 116 to log events of the remote LDAP directory servers 201A-201C. In one embodiment, the remote LDAP directory servers 201A-201C may maintain local flat logs and utilize the log entry generation module 116 to create back up or redundant LDAP logs and log entries 124.

In one embodiment, a log entry generation module 116 or equivalent application may be executed on a dedicated server separate from a standard LDAP directory server. This configuration may be used to support a large number of remote LDAP directory servers that utilize the LDAP logs.

Figure 3:
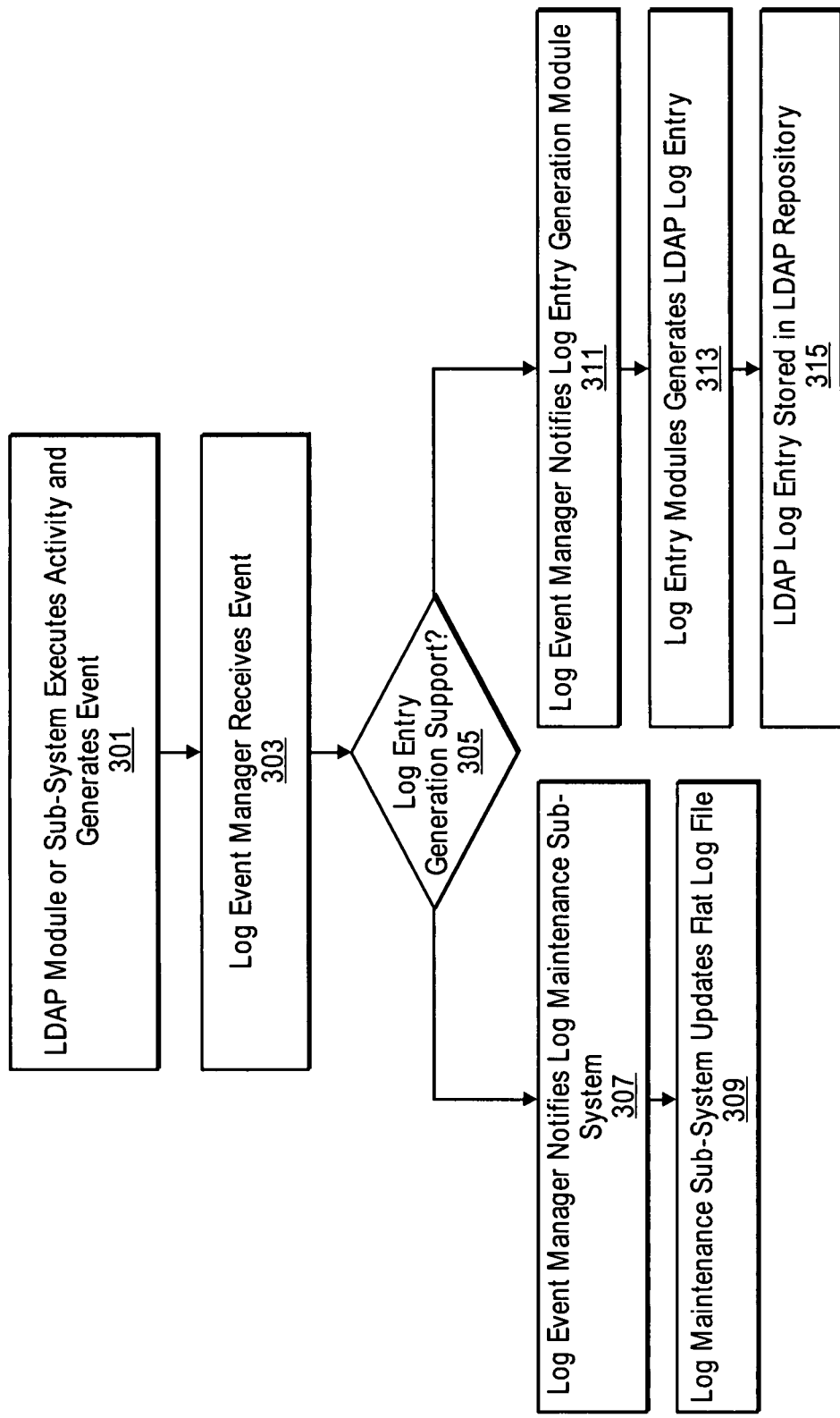
FIG. 3 is a flowchart of one embodiment of a process for handling events and activities to be logged.

FIG. 3 is a flowchart of one embodiment of a process for handling events to be logged. In one embodiment, the process of maintaining LDAP logs may be responsive to the generation or detection of an event in an LDAP module or sub-system through a log event manager or similar module (block 301). Any event in any application, LDAP module, LDAP sub-system, LDAP plug-in or similar program or system may be monitored for events or may be designed to generate messages related to the events.

The log event manager may be responsible for receiving and processing each of these events (block 303). The log event manager may analyze the detected events and to determine whether they are to be logged, in which log they are to be recorded, the location of the log and similar information. A configuration file, schema or LDAP entry may designate which types of events are to be logged. If an event is to be logged, the load event manager may determine what system supports or has been designated for a particular event (block 305). Some events may only be supported by a log maintenance sub-system that keeps its data in a flat log file, while other events may be supported by an LDAP log. A system administrator or user may also designate how particular events are to be handled by direct interaction with the log event manager or through modification of the relevant configuration files, schemas or LDAP entries.

If the log event manager determines that a log maintenance sub-system is to be utilized, then a message may be sent to the log maintenance sub-system (block 307). The message may indicate a type of event to be logged, source of the event, owner, time of the event and similar characteristics and parameters of the event. The log maintenance sub-system may take the data from the message and update the log file with the received information (block 309). The characteristics of the event type may be used to update the flat log file. The log maintenance sub-system may create entries in the flat log file in a standardized format. The log maintenance sub-system may convert the data received from the log event manager into the standard format of the log, requiring that all necessary parameters for each entry be supplied.

If the log event manager determines that a log entry generation module supports the received event, then a message may be sent by the log event manager to the log entry generation module (block 311). The message may contain information about the event including source, time, owner, type of event and similar information received about the event by the log event manager and data derived therefrom. The log entry generation module may use the received information to generate an LDAP log entry (block 313). The log entry generation module may convert the received information into an LDAP entry where the attributes or type of entry indicate the type of event or activity and the attributes and values represent the characteristics and parameters of the event to be recorded. For example, attribute value pairs may include timestamps, owners, line numbers and similar data. The LDAP log entry may then be stored in the LDAP repository (block 315).

Figure 4:
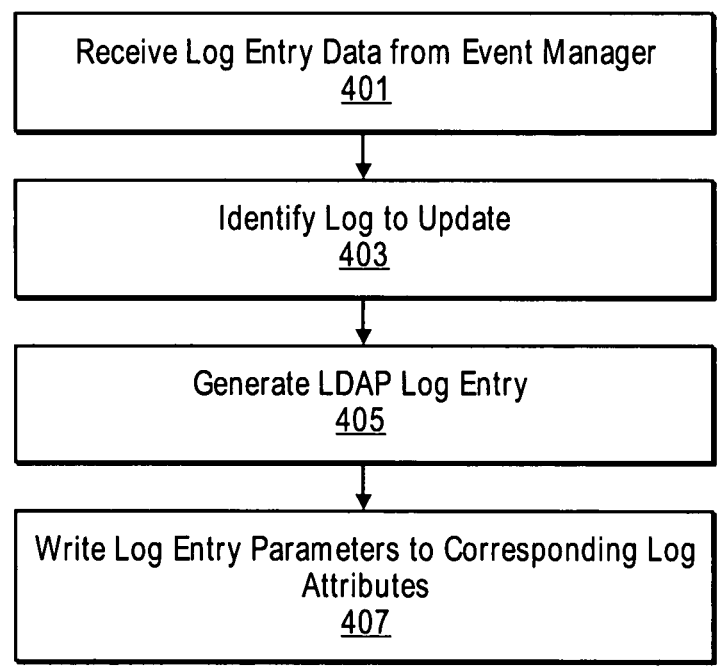
FIG. 4 is a flowchart of one embodiment of a process for generating a log entry.

FIG. 4 is a flowchart of one embodiment of a process for generating an LDAP log entry. In one embodiment, the log entry generation module or similar module or sub-system may execute this process. The log entry generation module may start this process in response to receiving a message from a log event manager or similarly detecting an event that was specified to be logged (block 401). In another embodiment, the modules or sub-systems may directly send a message to the log entry generation module.

The log entry generation module may analyze the received data to determine which of the logs maintained by the LDAP directory server are to be updated (block 403). A single event may generate multiple log entries. The logs to be updated may be determined based on the source of the event, an identifier in the message, parameter data or similar data or combinations thereof. The LDAP log entry may then be generated by the log entry generation module according to the format for the type of entry that may be specified in a configuration entry or schema (block 405). The LDAP log entry may be generated and stored in a general LDAP repository. In another embodiment, a dedicated or separate set of LDAP repositories may be utilized for the LDAP logs.

The data received from or derived from the message of the log event manager may be converted into attribute values matching the attributes of the LDAP log entry (block 407). The values may then be written to LDAP entry in the LDAP repository. A check may be made to determine if the LDAP entry is complete and additional information may be gathered if necessary. For example, a timestamp may be required for a particular log. The time may be obtained from an LDAP server module or plug-in to complete the necessary data for the LDAP log entry.

Figure 5:
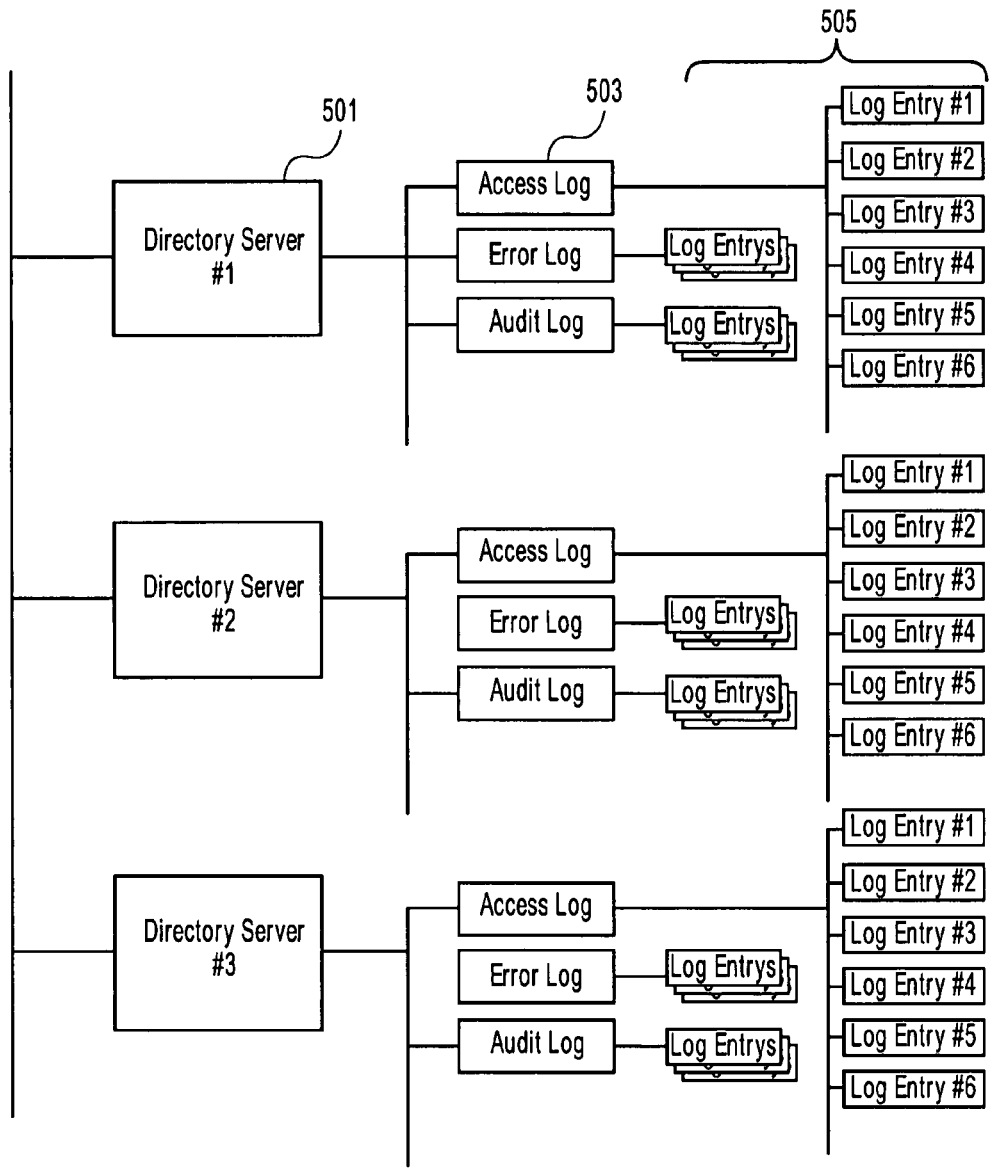
FIG. 5 is a diagram of one embodiment of an organization of log data.

FIG. 5 is a diagram of one embodiment of an organization of LDAP log data. In one embodiment, the LDAP log data may be organized in a hierarchy that may be described or defined in a configuration entry or schema and may be embodied in each individual log entry. In one embodiment, the LDAP log data is organized by the directory server 501 from which each LDAP log entry originates. In some embodiments, this level of organization may be omitted if there is only a single directory server or a small number of directory servers. Directory servers may be identified by any type of identifier including a unique numerical identifier or an alphanumeric identifier.

The LDAP log entry data may then be organized as a sub-tree according to the specific log 503 or type of log to which it belongs. Separate logs, such as access, error and audit logs may be tracked for each directory server. Each log may have an identifier that may be globally or relatively unique. This allows a user to easily identify and retrieve all the log entry records for a particular log for a specific directory server using standard LDAP operations such as LDAP queries.

The log entry level 505 may represent all of the LDAP log entries for each log on each server. In one embodiment, the LDAP log entries may have different types and may be further organized according to type of LDAP log entry. Also, LDAP log entries may be stored in different LDAP repositories, this may be represented at this level of the hierarchy or at another level of the hierarchy. Any number of LDAP log entries may be associated with each log and directory server. The directory server and access log identifiers may be a part of each LDAP entry. The configuration file or schema may designate the attributes and valid values that are associated with each level of the log entry hierarchy. An administrator may further modify or customize the organization to fit the needs of the systems he administers. For example, the administrator may designate that only certain servers have specific types of logs or similar organizational characteristics. Higher levels of organization may be added with groupings of directory servers or similar higher levels of organization.

Figure 6:
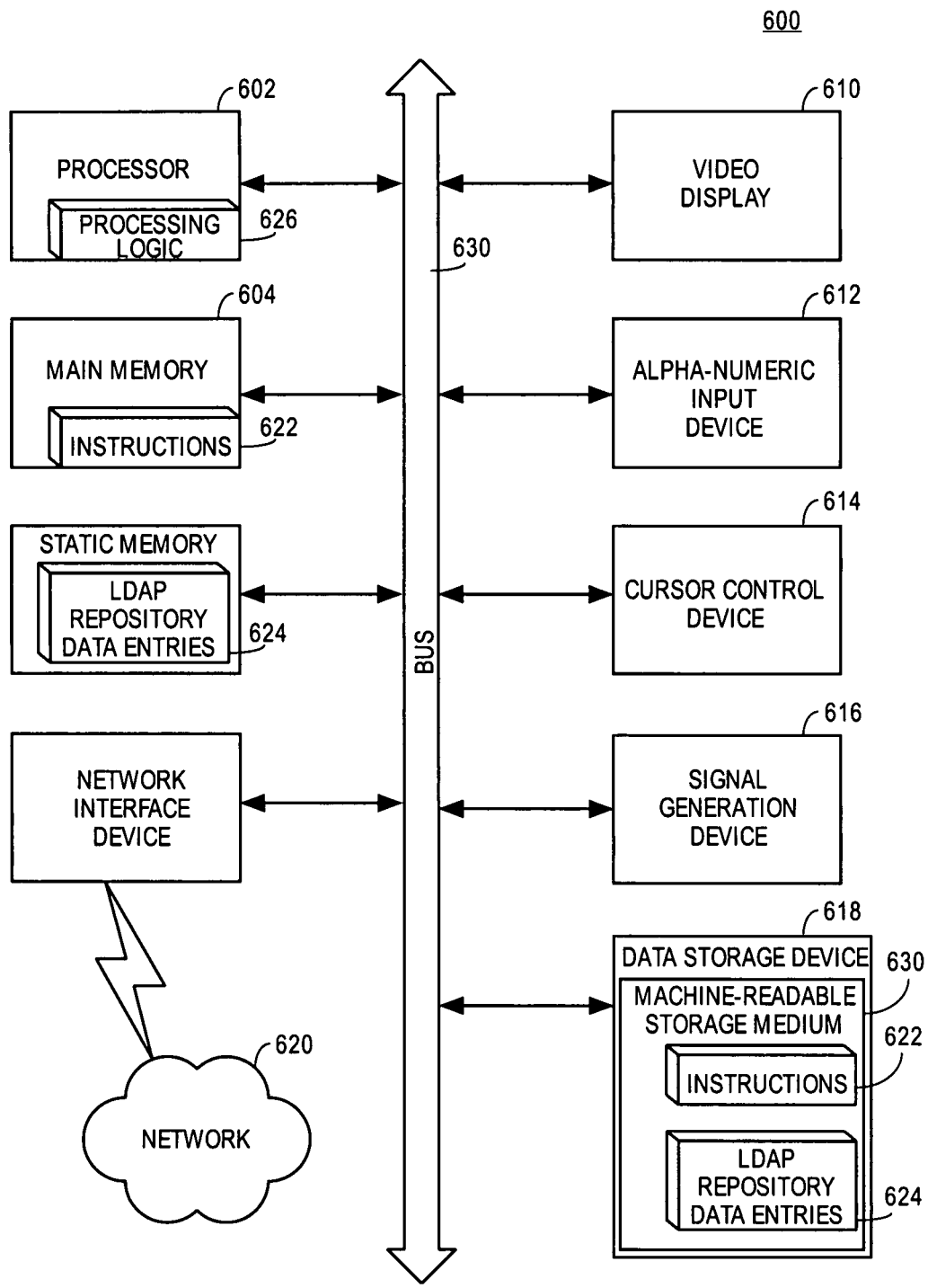
FIG. 6 is a diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet or the Internet. The machine may operate in the capacity of a server or a client machine in client-server network environment or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 may represent one or more general-purpose processing devices such as a microprocessor, central processing unit or the like. More particularly, the processing device may be a complex instruction set computing (CISC) microprocessor, reduced instruction set computing (RISC) microprocessor, very long instruction word (VLIW) microprocessor, or processor implementing other instruction sets or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

The machine-accessible storage medium 630 may also be used to store LDAP repository data entries 624. LDAP repository data entries 624 may also be stored in other sections of computer system 600, such as static memory 506.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories and optical and magnetic media.

Thus, a method and apparatus for managing logs as a set of LDAP entries have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
identifying, by a processing device executing a first lightweight directory access protocol (LDAP) directory server, an event associated with at least one of the first LDAP directory server or a remote second LDAP directory server;
analyzing, by the processing device, the event to determine which of a plurality of logs maintained by the first LDAP directory server to update, wherein the plurality of logs comprise at least two of an access log, an error log or an audit log;
generating, by the processing device, a log entry for the event in a form of an LDAP entry; and
storing the LDAP entry in the determined log in an LDAP repository.

2. The method of claim 1, further comprising:
storing a log entry parameter as an attribute of the LDAP entry.

3. The method of claim 1, wherein identifying the event comprises receiving an event indicator from the remote second LDAP directory server.

4. The method of claim 1, further comprising:
applying an LDAP operation to the log entry.

5. The method of claim 1, further comprising:
indexing a log containing the log entry.

6. The method of claim 1, further comprising:
organizing log entries into an LDAP entry hierarchy.

7. The method of claim 1, wherein the event is an error event, an audit event or an access event.

8. The method of claim 2, wherein the attribute may represent a time, an owner, a line number or an LDAP operation.

9. The method of claim 1, further comprising:
servicing an LDAP operation from the remote second LDAP directory server on the LDAP entry.

10. The method of claim 1, further comprising:
applying an LDAP search to locate the LDAP entry in the LDAP repository.

11. A system comprising:
a memory; and
a processing device coupled to the memory, the processing device to:
execute a first directory access protocol (LDAP) directory server;
identify a log event associated with at least one of the first LDAP directory server or a remote second LDAP directory server;
analyze the log event to determine which of a plurality of logs maintained by the first LDAP directory server to update, wherein the plurality of logs comprise at least two of an access log, an error log or an audit log;
generate a log entry for the log event in a form of an LDAP entry; and
cause the LDAP entry to be stored in the determined log in an LDAP repository.

12. The system of claim 11, wherein the log event is received from the remote second LDAP directory server.

13. The system of claim 11, further comprising:
the LDAP repository.

14. The system of claim 11, wherein the processing device is further to:
store a copy of the log event in a flat log file.

15. A non-transitory machine readable storage medium, having instructions stored therein, which when executed cause a processing device to perform a set of operations comprising:
identifying, by the processing device, an event associated with at least one of a first lightweight directory access protocol (LDAP) directory server or a remote second LDAP directory server;
analyzing, by the processing device, the event to determine which of a plurality of logs maintained by the first LDAP directory server to update, wherein the plurality of logs comprise at least two of an access log, an error log or an audit log;
generating a log entry for the event in a form of an LDAP entry; and
storing the LDAP entry in the determined log in an LDAP repository.

16. The non-transitory machine readable storage readable medium of claim 15, further comprising:
storing a log entry parameter as an attribute of the LDAP entry.

17. The non-transitory machine readable storage medium of claim 15, wherein identifying the event comprises receiving an event indicator from the remote second LDAP directory server.

18. The non-transitory machine readable storage medium of claim 15, further comprising:
applying an LDAP operation to the log entry.

19. The non-transitory machine readable storage medium of claim 15, further comprising:
indexing a log containing the log entry.

20. The non-transitory machine readable storage medium of claim 15, further comprising:
organizing log entries into an LDAP entry hierarchy.

21. The non-transitory machine readable storage medium of claim 15, wherein the event is an error event, an audit event or an access event.

22. The non-transitory machine readable storage medium of claim 16, wherein the attribute may represent a time, an owner, a line number or an LDAP operation.

23. The non-transitory machine readable storage medium of claim 15, further comprising:
servicing an LDAP operation from the remote second LDAP server on the LDAP entry.

24. The non-transitory machine readable storage medium of claim 15, further comprising:
applying an LDAP search to locate the LDAP entry in the LDAP repository.

* * * * *